United States Patent
Heinzelmann

(10) Patent No.: US 10,155,504 B2
(45) Date of Patent: Dec. 18, 2018

(54) MOTOR VEHICLE GEARBOX FOR A COMMERCIAL VEHICLE

(71) Applicant: ZF Friedrichshafen AG, Friedrichshafen (DE)

(72) Inventor: Karl-Fritz Heinzelmann, Meckenbeuren (DE)

(73) Assignee: ZF Friedrichshafen AG, Freidrichshafen (DE)

( * ) Notice: Subject to any disclaimer, the term of this patent is extended or adjusted under 35 U.S.C. 154(b) by 340 days.

(21) Appl. No.: 14/532,345

(22) Filed: Nov. 4, 2014

(65) Prior Publication Data

US 2015/0144454 A1    May 28, 2015

(30) Foreign Application Priority Data

Nov. 25, 2013  (DE) .......................... 10 2013 224 028

(51) Int. Cl.
*B60T 1/06* (2006.01)
*B60T 10/02* (2006.01)
*F16D 67/04* (2006.01)

(52) U.S. Cl.
CPC .............. *B60T 1/062* (2013.01); *B60T 10/02* (2013.01); *F16D 67/04* (2013.01)

(58) Field of Classification Search
CPC .......... F16D 57/02; F16D 57/04; F16D 67/04; F16H 47/08; B60T 1/062; B60T 1/087; B60T 10/02
See application file for complete search history.

(56) References Cited

U.S. PATENT DOCUMENTS

| 5,829,562 A * | 11/1998 | Adams .................... B60T 1/087 192/12 A |
| 8,573,376 B2 * | 11/2013 | Buri ........................ B60T 10/02 192/216 |
| 2013/0225365 A1 | 8/2013 | Huth et al. |

FOREIGN PATENT DOCUMENTS

| DE | 41 22 628 A1 | 1/1993 | |
| DE | 10305239 A1 * | 8/2004 | ............. B60K 17/00 |
| DE | 10 2009 001 147 A1 | 8/2010 | |
| DE | 10 2010 051 715 A1 | 5/2012 | |
| WO | WO 2013187822 A1 * | 12/2013 | ............. B60T 1/062 |

OTHER PUBLICATIONS

English Language Translation of DE10305239 from translationportal.epo.org/emtp/translate/?ACTION=description-retrieval&COUNTRY=DE&ENGINE=google&FORMAT=docdb&KIND=A1&LOCALE=en_EP&NUMBER=10305239&OPS=ops.epo.org%2F3.2&SRCLANG=de&TRGLANG=en. (Year: 2018).*
German Search Report Corresponding to 10 2013 224 028.7 dated Jul. 29, 2014.

\* cited by examiner

*Primary Examiner* — Jacob S. Scott
(74) *Attorney, Agent, or Firm* — Davis & Bujold PLLC; Michael J. Bujold

(57) ABSTRACT

A motor vehicle transmission (2) for a commercial vehicle which has at least one transmission input shaft (8, 9) and at least one transmission stage, which on a drive output side serves to connect, in each case, a driveshaft (22) of an associated retarder (3) and can be linked into a force flow. To enable the at least one retarder (3) to be connected on the drive input side of the motor vehicle transmission (2), a drive input side of the at least one transmission stage is arranged on the at least one transmission input shaft (8, 9).

11 Claims, 2 Drawing Sheets

MOTOR VEHICLE GEARBOX FOR A COMMERCIAL VEHICLE

This application claims priority from German patent application serial no. 10 2013 224 028.7 filed Nov. 25, 2013.

FIELD OF THE INVENTION

The invention concerns a motor vehicle transmission for a commercial vehicle, comprising at least one transmission input shaft and at least one transmission stage which on an output side serves to connect a respective drive input shaft of an associated retarder and can be linked into a force flow. In addition, the invention concerns a drive-train of a motor vehicle having a motor vehicle transmission as mentioned above.

BACKGROUND OF THE INVENTION

Retarders are used in drive-trains of commercial vehicles as wear-free braking devices and are then predominantly in the form of hydrodynamic retarders. In a hydrodynamic retarder the flow energy of fluid is used to produce a braking torque and for that purpose the fluid is introduced into a working space between a stator and a rotor. In the working space, which is usually of torus-shaped design, the rotating rotor entrains the fluid by means of vanes and directs it onto vanes of the stator, against which the liquid impinges and is then propelled back onto the vanes of the rotor. The returning liquid has a decelerating effect on the rotor, such that the size of a braking torque is controlled by the quantity of fluid introduced into the working space.

However, even when the working space is not full the rotating rotor produces a certain amount of braking torque which is caused by the pumped circulation of air and fluid residues between the rotor and the stator. To avoid these losses, also known as air losses, apart from during braking operation hydrodynamic retarders are partially decoupled from the remainder of the drive-train so that no rotation of the rotor takes place and the aforesaid pumped circulation is avoided. In some cases, for this the retarder is designed to be connected and disconnected within the motor vehicle transmission of the commercial vehicle concerned.

DE 10 2009 001 147 A1 describes a drive-train of a commercial vehicle, in which a hydrodynamic retarder and an electrodynamic retarder can be connected and disconnected within a motor vehicle transmission. For that purpose a spur gearwheel is mounted to rotate on a transmission output shaft, which can be fixed to the transmission output shaft by means of a shifting element and which meshes with each of two fixed wheels. Of the two fixed wheels one is fitted on a drive input shaft of the hydrodynamic retarder and one on a drive input shaft of the electrodynamic retarder. Together with the two fixed wheels the spur gear mounted to rotate on the transmission output shaft forms two gear steps by virtue of which, when the spur gearwheel is fixed to the transmission output shaft, rotation of the transmission output shaft is transmitted to the respective drive input shaft of the hydrodynamic retarder and the electrodynamic retarder. In turn, the transmission output shaft can be coupled by way of various gear steps of the motor vehicle transmission to a transmission input shaft, which can be connected on the drive input side by way of a friction clutch to the driveshaft of an internal combustion engine.

SUMMARY OF THE INVENTION

Starting from the above-described prior art, the purpose of the present invention is now to provide a motor vehicle transmission for a commercial vehicle in which at least one retarder can be connected for braking operation on the primary side, i.e. on the drive input side of the motor vehicle transmission.

This objective is achieved in combination with the characterizing features described below. Furthermore, a drivetrain of a motor vehicle in which a motor vehicle transmission according to the invention is used, is described below.

According to the invention, a motor vehicle transmission comprises at least one transmission input shaft and at least one transmission stage which serves on a drive output side to connect a respective drive input shaft of an associated retarder. The at least one transmission stage can be connected into a force flow in order to transmit rotational movement to its drive output side and thus, when the motor vehicle transmission is fitted, to produce a drive input to the retarder.

In the context of the invention the motor vehicle transmission can contain a plurality of gear steps, each of which serves for the connection of a respective drive input shaft, each drive input shaft being associated with a retarder. In the context of the invention the motor vehicle transmission can also have a group configuration, wherein the at least one transmission input shaft is then the input shaft of one of the transmission groups. The transmission group is then preferably a main group or a splitter group connected upstream from a main group. The transmission or transmission group having at least one transmission input shaft can also be of planetary, or of change-speed transmission design with a plurality of spur gear stages, and in the latter case there may be one or even two countershafts.

According to the invention, the at least one transmission stage to which, in the fitted state of the motor vehicle transmission, a respective drive input shaft and an associated retarder are connected, can be selectively connected into a force flow so that only after that connection does a transmission of rotational movement to the respective drive input shaft take place and, correspondingly, a braking action of the retarder connected thereto. Consequently, particularly with a hydrodynamic retarder, apart from during a braking operation, the occurrence of losses can be avoided since if the at least one transmission stage is not connected into the force flow, the drive input shaft is not driven and neither, therefore, is the rotor.

The invention, now, makes use of the technical principle that a drive input side of the at least one gear stage is arranged on the at least one transmission input shaft. In other words, the at least one gear stage is arranged in the area of the at least one transmission input shaft so that, in the fitted condition of the motor vehicle transmission, the at least one transmission input shaft is coupled directly to the drive input shaft of the associated retarder.

The connectability of a retarder on the drive input side by way of the respective transmission stage has the advantage that after connection a gear-dependent braking torque can be provided by the retarder, which as the gear becomes lower increases proportionally with the transmission ratio. Consequently, even at low driving speeds effective braking can take place. Due to the fact that the at least one transmission stage can selectively be connected into the force flow, a drive input into the retarder can be made dependent on braking operation. When there is no connection of the at least one transmission stage into the force flow, the associated retarder is not driven so that, apart from during braking operation, the occurrence of losses can be avoided.

Otherwise than as described above, in the case of DE 10 2009 001 147 A1 the transmission stage is provided on the drive output side of the motor vehicle transmission. Consequently, the amount of braking torque that can be effectively produced on drive input gearwheels of the motor vehicle concerned cannot be influenced by engaging gears in the motor vehicle transmission.

In an embodiment of the invention the at least one transmission stage is made as a spur gear stage, such that a spur gearwheel on the drive input side of the at least one transmission stage is mounted to rotate on the at least one transmission input shaft, whereas a spur gearwheel on the drive output side, which meshes with the drive input-side spur gear, serves to connect the respective drive input shaft. Alternatively, however, within the scope of the invention it is also quite conceivable for a drive input-side spur gear to be connected in a rotationally fixed manner on the at least one transmission input shaft whereas a spur gear on the drive output side, which meshes therewith, is mounted to rotate on the respective drive input shaft and is only connected in order to connect the at least one transmission stage to the drive input shaft.

Furthermore, in a drive-train in which more than one retarder can be engaged, the associated gear stages can also be combined in such manner that a conjoint drive input-side spur gear is provided for the gear stages, which then meshes both with a spur gear on the drive output side on the drive input shaft of one retarder and also with a spur gear provided on the drive output side of the respective other retarder.

Furthermore, in the context of the invention it is also conceivable that the at least one transmission stage uses the spur gears of a gear of the motor vehicle transmission, in that a spur gear of the at least one transmission stage arranged to rotate on the drive input shaft of the retarder meshes with a loose or a fixed wheel of a gear step. In this case the fixed wheel of the gear step is then preferably provided on the at least one transmission input shaft, so that the retarder is connected just by fixing the spur gear of the at least one transmission stage to the drive input shaft. Then, no axially separate spur gear step has to be provided as the transmission stage, but rather, the retarder can be connected in a common plane with the gear step concerned. Finally, the at least one transmission stage can in principle also be of planetary design.

In a further development of the invention two transmission input shafts are provided, each associated with a partial transmission and each able individually to be connected into a force flow. It is further preferred that the motor vehicle transmission is then designed in the manner of a dual-clutch transmission, in which the transmission input shafts can be connected individually into the force flow by means of respectively associated powershift elements, the powershift elements being combined in a double clutch.

In a further preferred design of the invention, the drive input-side spur gear of the at least one transmission stage is mounted to rotate on a first transmission input shaft, and the drive input-side spur gear can then be connected rotationally fixed either to the first transmission input shaft or to a second transmission input shaft. By virtue of such a design of a motor vehicle transmission, one retarder can be made connectable for both partial transmissions. In a further development of this possible design of the invention, the spur gear on the drive input side can be connected rotationally fixed on the one hand, by means of a first shifting element, to the first transmission input shaft, and on the other hand, by means of a second shifting element, to the second transmission input shaft.

According to the invention, in a drive-train having a motor vehicle transmission according to the invention, in particular a hydrodynamic retarder is provided although alternatively or even in addition thereto an electrodynamic retarder can also be arranged in the drive-train. The respective transmission ratio of the at least one transmission stage is preferably designed as a step-up stage by means of which, when engaged, rotational movement of the drive input shaft of the associated retarder is stepped up to the fast range.

The invention is not limited to the combination of features indicated in the principal claim or the claims that depend on it. There are additional possibilities for combining individual features with one another, provided that they emerge from the claims, the description of preferred embodiments of the invention given below, or directly from the drawings. The reference of the claims to the drawings by the use of indexes is not intended to restrict the protective scope of the claims.

BRIEF DESCRIPTION OF THE DRAWINGS

Advantageous design features of the invention, which are explained below, are illustrated in the drawings, which show.

DETAILED DESCRIPTION OF THE PREFERRED EMBODIMENTS

Figure 1:
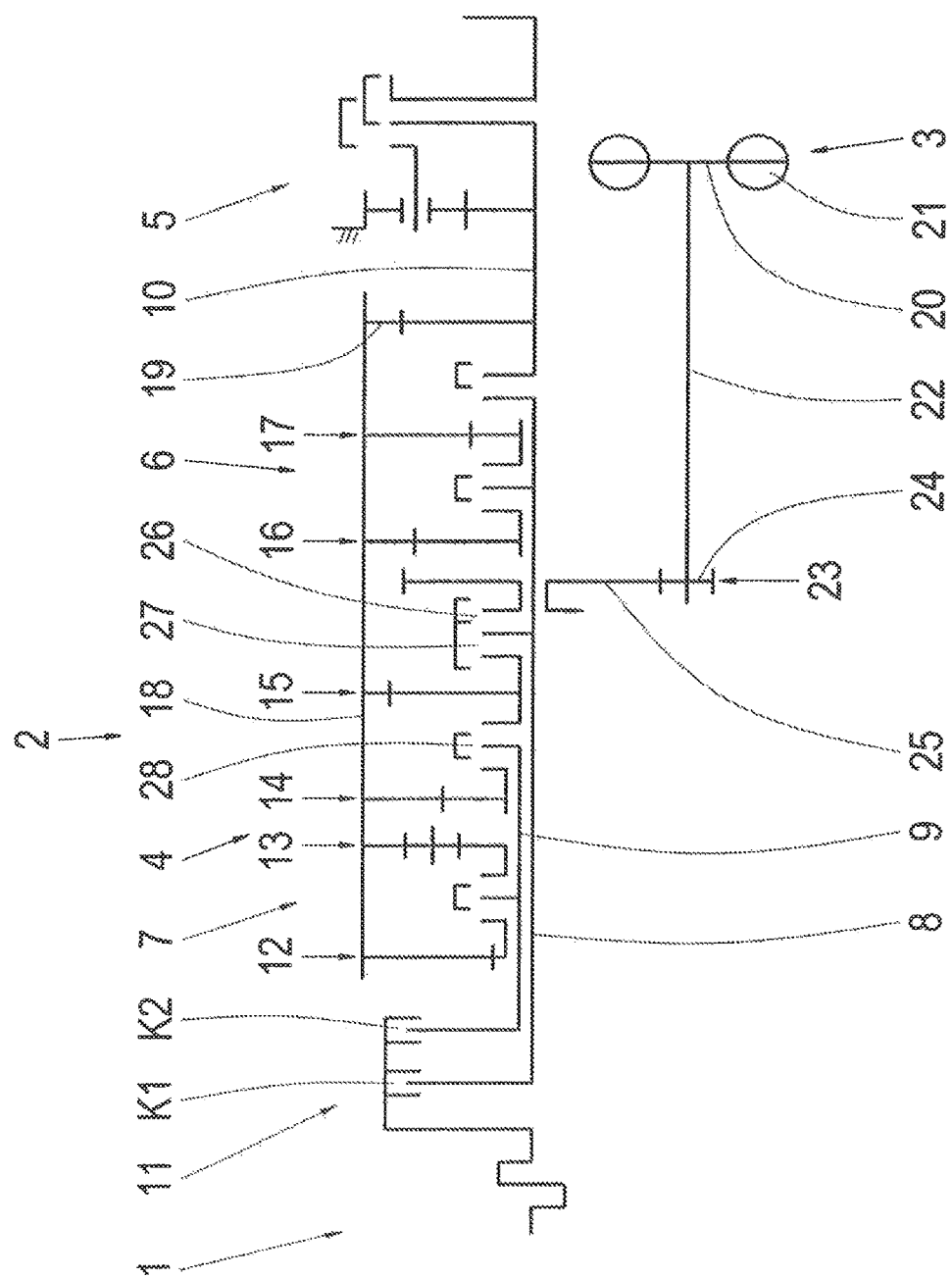
FIG. 1: A schematic view of part of a drive-train with a motor vehicle transmission that corresponds to a first embodiment of the invention.

FIG. 1 shows part of a drive-train of a commercial vehicle having an internal combustion engine 1, a motor vehicle transmission 2 and a hydrodynamic retarder 3. In this case the motor vehicle transmission 2 is of group configuration and consists of a main group 4 in the form of a dual-clutch transmission and, connected downstream from the main group 4, a range group 5 of planetary design.

As can be seen in FIG. 1, the main group 4 is formed by two partial transmissions 6 and 7 with which, in a manner whose principle is known to those familiar with the field, in each case a respective transmission input shaft 8 and 9 is associated and which have a common transmission output shaft 10, the output shaft 10 at the same time forming the input shaft of the downstream range group 5. The two transmission input shafts 8 and 9 extend coaxially with one another in that the transmission input shaft 9 is in the form of a hollow shaft through which the transmission input shaft 8 passes. The partial transmissions 6 and 7 can be connected into a force flow by means of powershift elements K1 and K2, each associated respectively with one of the transmission input shafts 8 or 9, and which when actuated couple the respectively associated transmission input shaft 8 or 9 in a rotationally fixed manner with a drive output side of the internal combustion engine 1. In the present case the powershift elements are made in the form of wet-operating friction clutches and are combined in a double clutch 11.

As can be seen in FIG. 1, the partial transmissions 6 and 7 have a plurality of gear steps 12 to 17 of which, by way of the gear steps 12 to 14 when engaged in the force flow, rotational movement of the transmission input shaft 9 can be transmitted to a countershaft 18 axially offset with respect to the transmission input shafts 8 and 9, whereas in contrast the gear steps 16 and 17 when engaged individually, couple the transmission input shaft 8 to the countershaft 18. On the other hand, the gear step 15 can be used both by the transmission input shaft 8 and also by the transmission input shaft 9 for coupling to the countershaft 18. In turn, the countershaft 18 is permanently connected by way of a drive output constant 19 to the transmission output shaft 10, which can also be connected in a rotationally fixed manner directly to the transmission input shaft 8 extending coaxially with it.

In a manner known to those familiar with the subject, the hydrodynamic retarder 3 consists of a rotor 20 and a stator 21 which define between them a working space that can be filled with a fluid. The rotor 20 is arranged rotationally fixed on a drive input shaft 22, by which rotational movement of the rotor 20 is produced and upon which, when a fluid is introduced into the working space, a braking torque can be exerted.

As a special feature, the hydrodynamic retarder 3 can now be selectively connected in the area of the transmission input shafts 8 and 9 of the motor vehicle transmission 2, so that the braking torque acting on the drive input shaft 22 when the retarder 3 is in braking operation can be transmitted correspondingly to the transmission input shaft 8 or 9 concerned. For that purpose a spur gear stage 23 is provided, which consists of a spur gear 24 arranged rotationally fixed on the drive input shaft 22 and, meshing therewith, a spur gear 25. The spur gear 25 is mounted to rotate on the transmission input shaft 8 and, together with the spur gear 24, defines a transmission ratio by which rotational movement on the drive input side is stepped up to a fast range at the input shaft 22 of the retarder 3.

As can also be seen in FIG. 1, the spur gear 25 can now be coupled to the transmission input shaft 8 so that rotational movement of the transmission input shaft 8 is correspondingly transmitted to the input shaft 22. For that purpose the spur gear 25 can be fixed by a shifting element 26 to the transmission input shaft 8, whereby a corresponding coupling of the transmission input shaft 8 to the input shaft 22 is formed.

In the present case the shifting element 26 is combined in a double shifting element with a shifting element 27, which serves to connect the gear step 15 to the transmission input shaft 8. The two shifting elements 26 and 27 are in this case in the form of barrier synchronizers, whereas the further shifting elements of the gear steps 12 to 14 and 16 to 17—not indexed individually here—and also a shifting element for the direct rotationally fixed coupling of the transmission input shaft 8 to the transmission output shaft 10, are individually also in the form of barrier synchronizers and are in some cases combined in double shifting elements.

Braking operation of the hydrodynamic retarder 3 can now be brought about while the commercial vehicle concerned is driving, by a corresponding drive input-side connection of the drive input shaft 22 by means of the spur gear stage 23. For this, while driving in one of the gears of the partial transmission 6 the shifting element 26 is simply actuated and the corresponding rotationally fixed connection of the spur gear 25 to the transmission input shaft 8 is formed. Consequently, with the help of the spur gear stage 23 a braking torque is transmitted to the transmission input shaft 8, which in turn is transmitted by the respective gear engaged in the partial transmission 6 and by way of the gear selected in the downstream range group 5 to the drive wheels of the commercial vehicle.

In contrast, if the shifting element 26 has not been actuated, then no rotational movement is transmitted to the spur gear 25 and accordingly the retarder 3 is not driven. Consequently, apart from during a braking action of the retarder 3 air losses can be avoided, which would otherwise occur owing to the pumped circulation of air and fluid in the working space of the retarder 3 when the rotor 20 rotates.

Figure 2:
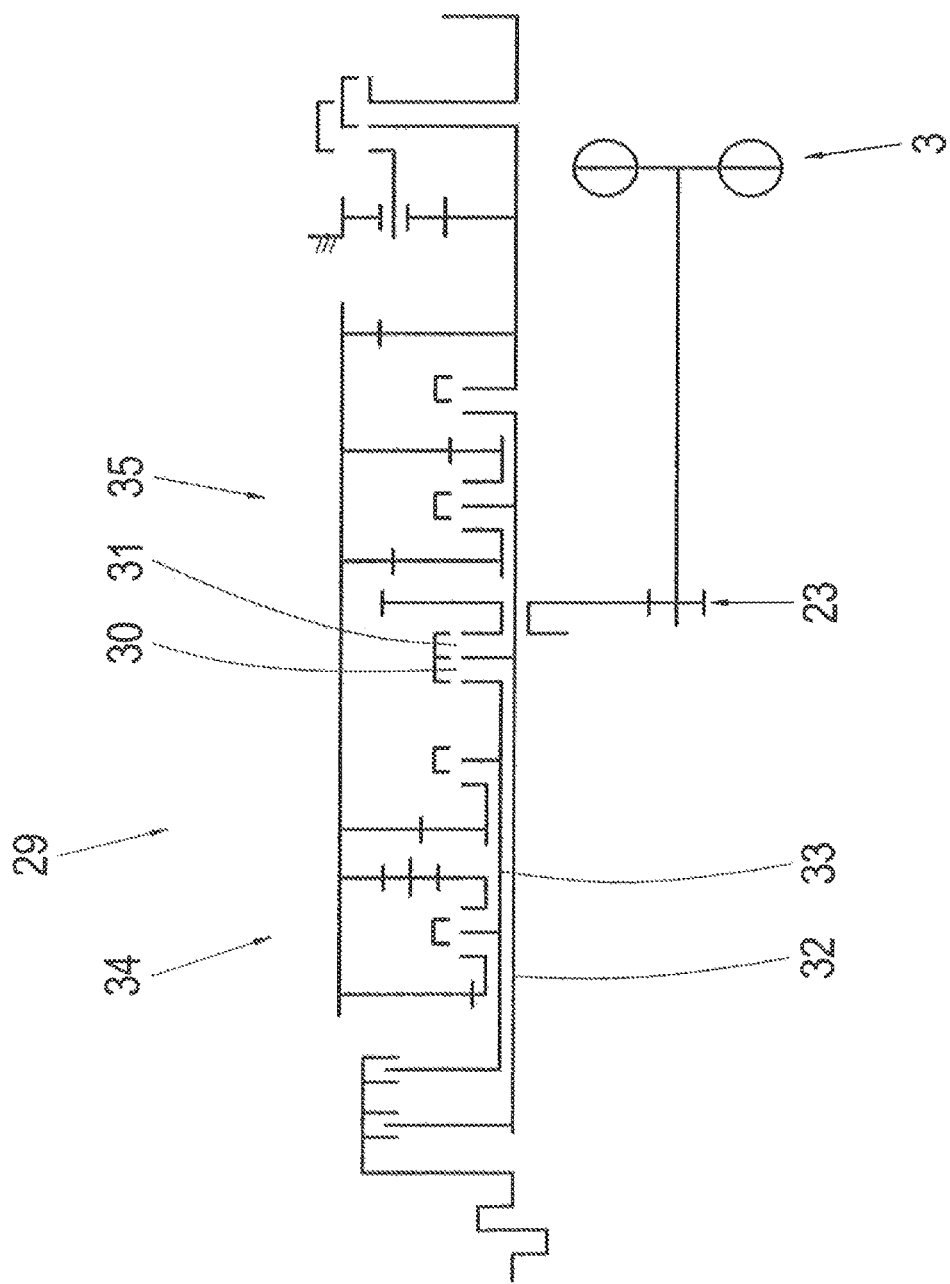
FIG. 2: A schematic view of part of a drive-train with a motor vehicle transmission, comprising a motor vehicle transmission according to a second embodiment of the invention.

Furthermore, FIG. 2 shows a schematic view of part of a drive-train which corresponds in large measure to the variant shown in FIG. 1. Otherwise than in the earlier design a motor vehicle transmission 29 is configured in accordance with a second possible version, in which on the drive input side the spur gear stage 23 can be coupled in a rotationally fixed manner by means of shifting elements 30 and 31, on the one hand to a first transmission input shaft 32 and on the other hand to a second transmission input shaft 33 of the motor vehicle transmission 29. Thus, in this case the retarder 3 can operate with a braking action in both partial transmissions 34 and 35 of the motor vehicle transmission 29. When so connected, rotational movement of the respective transmission input shaft 32 or 33 concerned is then transmitted to the driveshaft 22 of the retarder 3.

By virtue of the design of a motor vehicle transmission according to the invention and its arrangement in a drive-train of a commercial vehicle, a retarder can be connected on the primary side of the motor vehicle transmission concerned, in such manner that apart when so connected, losses in the retarder can be avoided.

INDEXES

1 Internal combustion engine
2 Motor vehicle transmission
3 Hydrodynamic retarder
4 Main group
5 Range group
6 Partial transmission
7 Partial transmission
8 Transmission input shaft
9 Transmission input shaft
10 Transmission output shaft
11 Dual clutch
12 Gear step
13 Gear step
14 Gear step
15 Gear step
16 Gear step
17 Gear step
18 Countershaft
19 Drive output constant
20 Rotor
21 Stator
22 Driveshaft
23 Spur gear stage
24 Spur gearwheel
25 Spur gearwheel
26 Shifting element
27 Shifting element
28 Shifting element
29 Motor vehicle transmission
30 Shifting element
31 Shifting element
32 Transmission input shaft
33 Transmission input shaft
34 Partial transmission
35 Partial transmission
K1 Powershift element
K2 Powershift element

The invention claimed is:
1. A motor vehicle transmission for a commercial vehicle comprising:

first and second transmission input shafts, the first and the second transmission input shafts being connectable, via a double clutch, to a force flow such that the first transmission input shaft and the second transmission input shaft are drivable in the force flow independent of each other;

at least one transmission stage having a drive input side and a drive output side, and the at least one transmission stage is located upstream of at least a range group;

a retarder being solely connected to a first spur gearwheel of the at least one transmission stage, upstream of the range group, via a driveshaft; and the drive input side of the at least one transmission stage is arranged on the first transmission input shaft, the drive input side of the at least one transmission stage is connectable, via a shift element, to the first transmission input shaft downstream from the double clutch, and the drive input side of the at least one transmission stage is connectable, via at least one further shift element, to the second transmission input shaft downstream from the double clutch.

2. The motor vehicle transmission according to claim 1, wherein the at least one transmission stage is a spur gear stage which has a second spur gearwheel, the second spur gearwheel is on the drive input side of the at least one transmission stage, and is mounted for directly rotating with the first transmission input shaft, and the first spur gearwheel is on the drive output side of the at least one transmission stage, and directly meshes with the second spur gearwheel, on the drive input side, and serves to form a rotationally fixed connection to the driveshaft.

3. The motor vehicle transmission according to claim 1, wherein the first and the second transmission input shafts are each associated with a respective partial transmission, and the first and the second transmission input shafts are alternately connectable, via the double clutch, into the force flow.

4. The motor vehicle transmission according to claim 2, wherein the second spur gearwheel, on the drive input side of the at least one transmission stage, is mounted on the first transmission input shaft such that the second sour gearwheel is rotatable relative to the first transmission input shaft, and the second spur gearwheel is connectable, in a rotationally fixed manner, to the first transmission input shaft and is connectable, in a rotationally fixed manner, to the second transmission input shaft.

5. The motor vehicle transmission according to claim 4, wherein the second spur gearwheel, on the drive input side, is connectable in a rotationally fixed manner to the first transmission input shaft downstream of the double clutch, via a first shifting element, and the second spur gearwheel, on the drive input side, is connectable in a rotationally fixed manner to the second transmission input shaft downstream of the double clutch, via a second shifting element.

6. The motor vehicle transmission according to claim 4, in combination with the retarder, wherein the retarder is connected with the driveshaft and is actuatable by connecting the at least one transmission stage.

7. The motor vehicle transmission according to claim 6, wherein the retarder is a hydrodynamic retarder.

8. The motor vehicle transmission according to claim 1, in combination with a drive-train of the commercial vehicle, and the retarder is connected with the driveshaft and is actuated by connecting the at least one transmission stage.

9. A drive-train of a commercial vehicle comprising:
at least one retarder; and
a motor vehicle transmission comprising:
first and second transmission input shafts, the first transmission input shaft being connectable, via a first shift element of a double clutch, to a force flow and the second transmission input shaft being connectable, via a second shift element of the double clutch, to the force flow such that the first transmission input shaft and the second transmission input shaft are alternately drivable in the force flow independent of each other; and
at least one transmission stage having a drive output side located upstream of at least a range group;
the at least one retarder being solely connected to a spur gear wheel of the at least one transmission stage, upstream of the range group, via a driveshaft; and
a drive input side of the at least one transmission stage is arranged on the first transmission input shaft, the at least one transmission stage is connectable, via a third shift element, to the first transmission input shaft downstream from the first shift element of the double clutch, and the at least one transmission stage is connectable, via at least a fourth shift element, to the second transmission input shaft downstream from the second shift element of the double clutch;
wherein the at least one retarder is directly connected with the driveshaft and is actuatable by connecting the at least one transmission stage into the force flow.

10. The drive-train according to claim 9, wherein the at least one retarder is a hydrodynamic retarder.

11. A motor vehicle transmission for a commercial vehicle, the transmission comprising:
first and second transmission input shafts, the first transmission input shaft being connectable, via a first shift element of a double clutch, to a force flow from a drive engine, and the second transmission input shaft being connectable, via a second shift element of the double clutch, to the force flow from the drive engine such that the first transmission input shaft and the second transmission input shaft are alternately drivable in the force flow from the drive engine independent of each other;
a plurality of transmission stages and a range group, a first transmission stage of the plurality of transmission stages comprises a drive input side and a drive output side and is located upstream from the range group;
the drive input side of the first transmission stage is a second spur gear wheel that is directly connectable, via a third shift element, in a rotationally fixed manner to the first transmission input shaft, and the second spur gear wheel is directly connectable, via a fourth shift element, in a rotationally fixed manner to the second transmission input shaft,
the drive output side of the first transmission stage is a first spur gear wheel of the first transmission stage, the first and the second spur gear wheels continually mesh with each other, a retarder is solely connected, via a driveshaft and the first spur gear wheel, to the second spur gear wheel of the first transmission stage such that the retarder is connectable, via the first transmission stage and the first and the second transmission input shafts into the force flow which flows from the drive engine to an output shaft of the transmission.

* * * * *